United States Patent
Gronberg et al.

(10) Patent No.: US 7,324,964 B2
(45) Date of Patent: Jan. 29, 2008

(54) METHOD AND APPARATUS FOR COMMERCE ITEM INFORMATION HOMOGENIZATION IN ELECTRONIC COMMERCE SYSTEM

(75) Inventors: Martin L. Gronberg, Los Altos, CA (US); C. Wade Chambers, Fremont, CA (US)

(73) Assignee: America Online, Inc., Dulles, VA (US)

( * ) Notice: Subject to any disclaimer, the term of this patent is extended or adjusted under 35 U.S.C. 154(b) by 689 days.

(21) Appl. No.: 10/008,772

(22) Filed: Dec. 6, 2001

(65) Prior Publication Data

US 2003/0126026 A1 Jul. 3, 2003

(51) Int. Cl.
*G06Q 30/00* (2006.01)

(52) U.S. Cl. ....................................................... 705/26
(58) Field of Classification Search ................... 705/10, 705/26, 27, 28, 22
See application file for complete search history.

(56) References Cited

U.S. PATENT DOCUMENTS

| | | | | |
|---|---|---|---|---|
| 4,992,940 A | 2/1991 | Dworkin | ..................... | 364/401 |
| 5,283,731 A | 2/1994 | Lalonde et al. | ............. | 364/401 |
| 5,715,314 A | 2/1998 | Payne et al. | .................. | 380/24 |
| 5,926,798 A | 7/1999 | Carter | .......................... | 705/26 |
| 5,974,406 A | 10/1999 | Bisdikian et al. | .............. | 707/1 |
| 6,014,644 A | 1/2000 | Erickson | ....................... | 705/37 |
| 6,029,141 A | 2/2000 | Bezos et al. | | |
| 6,055,513 A | 4/2000 | Katz et al. | ..................... | 705/26 |
| 6,061,057 A | 5/2000 | Knowlton et al. | .......... | 345/335 |
| 6,061,665 A | 5/2000 | Bahreman | ..................... | 705/40 |
| 6,070,147 A | 5/2000 | Harms et al. | .................. | 705/14 |
| 6,101,482 A | 8/2000 | DiAngelo et al. | ............ | 705/26 |
| 6,119,101 A | 9/2000 | Peckover | ...................... | 705/26 |
| 6,131,087 A | 10/2000 | Luke et al. | ................... | 705/26 |
| 6,134,532 A | 10/2000 | Lazarus et al. | ............... | 705/14 |
| 6,134,548 A | 10/2000 | Gottsman et al. | .............. | 707/5 |
| 6,141,006 A | 10/2000 | Knowlton et al. | .......... | 245/335 |

(Continued)

FOREIGN PATENT DOCUMENTS

EP 0845748 3/1998 .................... 17/60

(Continued)

OTHER PUBLICATIONS

Lincke & Schmid, *Mediating Electronic Product Catalogs*, Jul. 1998, vol. 41, No. 7, Communications of the ACM.

(Continued)

*Primary Examiner*—Ronald Laneau
(74) *Attorney, Agent, or Firm*—Michael A. Glenn; Glenn Patent Group (57) ABSTRACT

A system for use in an online merchant system which includes a system for homogenizing the format of received commerce item information from at least two distinct online entities, an aggregate database for storing the homogenized commerce item information, and a user interface that accesses the aggregate database for query and retrieval of competitive commerce item information from the online entities and displays it within a user's Web browser window. The system comprises a method and apparatus for associating a commerce item information tag with each separate unit of commerce item information that is received to the online merchant system, the commerce item information tag enabling recording and reporting commerce metrics related to the commercial activity of a commerce item for sale through the online merchant system.

8 Claims, 4 Drawing Sheets

U.S. PATENT DOCUMENTS

| | | | |
|---|---|---|---|
| 6,141,653 A | 10/2000 | Conklin et al. | 705/80 |
| 6,163,772 A | 12/2000 | Kramer et al. | 705/79 |
| 6,178,409 B1 | 1/2001 | Weber et al. | 705/79 |
| 6,292,894 B1 | 9/2001 | Chipman et al. | 713/168 |
| 6,493,742 B1 | 12/2002 | Holland et al. | |
| 6,907,401 B1* | 6/2005 | Vittal et al. | 705/26 |
| 2002/0147656 A1* | 10/2002 | Tam et al. | 705/26 |
| 2002/0152284 A1* | 10/2002 | Cambray et al. | 709/218 |
| 2002/0184116 A1* | 12/2002 | Tam et al. | 705/27 |
| 2003/0023511 A1* | 1/2003 | Gardner, Sr. | 705/27 |

FOREIGN PATENT DOCUMENTS

| | | | |
|---|---|---|---|
| EP | 1845749 | 3/1998 | 17/60 |
| WO | 03/050652 A2 | 6/2003 | |

OTHER PUBLICATIONS

Calderbank, A., *Going Vertical: An online gift registry*, Jan. 6, 1997, Computer Reseller News, Manhasset.

Busillo, T., *Baby Talk launches online gift registry*, Apr. 1998, Home Textiles Today, High Point.

Powley Benjamin, Grossman,Neches, Postel, Brodersohn, Fadia, Zhu, Will, *Dasher: A Prototype for Federated E-Commerce Services*, Nov.-Dec. 1997, IEEE Internet Computing.

*Amazon,Target eye pact*; Sep. 11, 2001, CNN Money.

Don Steinberg; *The Man with the E-Commerce Answer—Technology Supergenius Mark Lucente wants to give your Web site a brain so it can have a nice, profitable conversation with customers*; DIALOG printout, p. 1-3; Ziff Davis Smart Business for the New Economy; Feb. 1, 2001.

Clinton Wilder; *The Complete Package—With the novelty of the internet worn off, online shoppers will expect a lot more than fast Web sites and timely delivery this holiday season*; DIALOG printout, p. 3-4; InformationWeek; Oct. 16, 2000.

Lusbeth B. Chuck; *Online Shopping: Confusion. Glut. Overload. and Misinformation*; DIALOG printout pp. 5-6; Searcher; Apr. 2000.

*Exploring Alternatives—A Growing Number of Sites Offer a Variety of Services, Ranging from Online Auctions to Detailed Catalogs to Comparative Technical Data*; DIALOG printout pp. 7-8; Electronic Buyers News; n1168, p. 14; 1999.

\* cited by examiner

METHOD AND APPARATUS FOR COMMERCE ITEM INFORMATION HOMOGENIZATION IN ELECTRONIC COMMERCE SYSTEM

BACKGROUND OF THE INVENTION

The invention relates to a method and apparatus for homogenizing information related to goods or services sold through an online merchant system. The invention further relates to a method of tracking and reporting commerce metrics in an electronic commerce shopping and merchandising system.

DESCRIPTION OF THE RELATED ART

Figure 1:
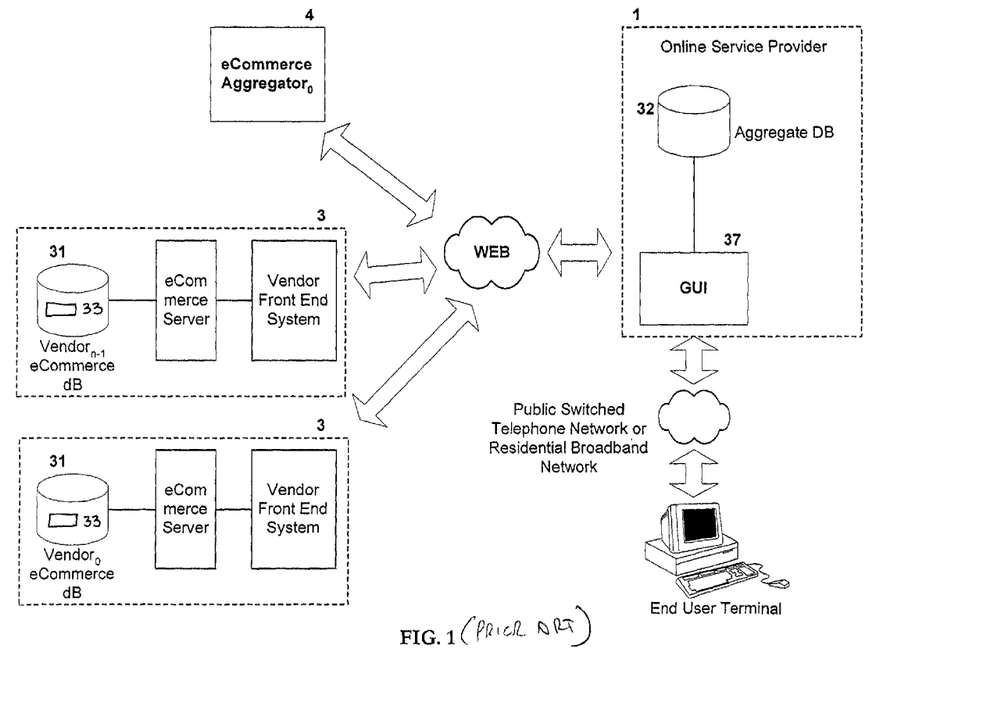
FIG. 1 depicts a block diagram of the Web illustrating the context within which an embodiment of the present invention is practicable, the OSP 1 is accessible by the distinct vendors 3 via a backbone network, e.g. Internet.

The World Wide Web ("Web") is part of a global computer network known as the Internet through which Online Service Providers ("OSPs") 1, such as Microsoft Network, CompuServe, Prodigy and America Online, enable on-line users ("Users") of OSPs 1 to link to the Web. See FIG. 1. As a result Users may access the Web sites of a variety of online entities to retrieve a variety of content as well as purchase a variety of products and services from distinct online entities. Users may directly access the online merchant systems of distinct vendors 3 on the Web and also the online merchant systems of eCommerce Aggregators 4. Online eCommerce aggregators 4 access, search and retrieve product information from various vendor databases to provide a comparison shopping mechanism for Users of the aggregator's 4 Web site.

A Web based online merchant system enables an online entity, such as a vendor 3 or aggregator 4, to particularize the Web site pages that display and describe its product or services, i.e. "commerce items", to Users. The online entity determines the layout and display of Web site pages having descriptive content including text, images, sound and video. The general manner of creating Web site content using HyperText Markup Language (HTML) and delivering it to Web browsers is well known in the art. Users may access an online entity's merchant Web site using a Web browser, e.g. Netscape Navigator, installed on a client connected to the Web through an OSP 1. The User's Web browser loads and interprets the HTML to format and display the online entity's Web page for the User's Web browser. An online merchant system may also provide a User interface, e.g. GUI, to enable shoppers to navigate a online entity's site and identify commerce items of interest, obtain specific information regarding commerce items, and to electronically purchase commerce items.

For the purpose of this application, a vendor 3 is considered to be any online entity that engages in commercial transactions involving commerce items. Vendors 3 typically store information, i.e. "commerce item information 33", related to its commerce items such as product descriptions, specifications, prices and images, in relational databases. Relational databases are well known in the art and generally comprise a logical design structure, i.e. a schema, that defines the groupings, e.g. tables, of data, the distinguishing characteristics, e.g. attributes, of that data, and the relationships between different groupings of data in a vendor database 31. Once the vendor's database schema is designed, the vendor 3 may use a database management system, also well known in the art, to build and administer its database. Thus, vendors 3 typically create an internal proprietary schema to organize and manage their databases 31.

Most commercially available online merchant systems require that vendors 3 organize vendor commerce item information 33 in databases 31 according to a predefined schema. Thus, because various vendors 3 organize their item information 33 according to proprietary database schemas, to use these systems a vendor 3 must either convert its existing database 31 to a different and predefined schema, or the vendor 3 must create a new database 31 having the predefined schema. Either option requires substantial efforts and costs which may indirectly force vendors 3 to compromise their database design and management. It follows that Users are less is likely to have a successful shopping experience while visiting the vendor's merchant Web site. Other vendors 3 may simply forego making their databases 31 available to Users because of the cost of implementing a high quality merchant Web site.

One potential solution is to standardize the format of communicated commerce item information 33 between online entities. Alternatively, a single online entity could provide and manage an aggregate database 32 that combines the commerce item information 33 from several distinct vendors 3. However, since each vendor 3 has likely developed an internal proprietary database schema, it is likely that the commerce item information 33 from the distinct vendors 3 would have differing formats that will make the aggregate database 32 difficult to successfully build, manage, and search. Thus, it would be desirable to enable distinct vendors 3 to facilitate commercial transactions of their commerce items through an aggregate database 32 by homogenizing the format of commerce item information 33 from distinct vendors 3.

A potential drawback to the above proposed solution is loss of control over commerce metrics that measure the commercial activity related to a commerce item for sale through an online merchant system. Thus, it would also be desirable to provide a means of enabling a vendor 3 to retrieve commerce metrics related to the commerce items sold from an aggregate database 32 and an online merchant system.

SUMMARY OF THE INVENTION

A typical system implementing the invention includes both hardware and software systems within an online merchant system. Included in the hardware and software system are those components necessary to provide internet access between OSPs 1 and distinct vendors 3 of commerce items. Such Internet infrastructure hardware and software systems are readily available and their operation and design are obvious to those of ordinary skill in those arts.

Figure 3:
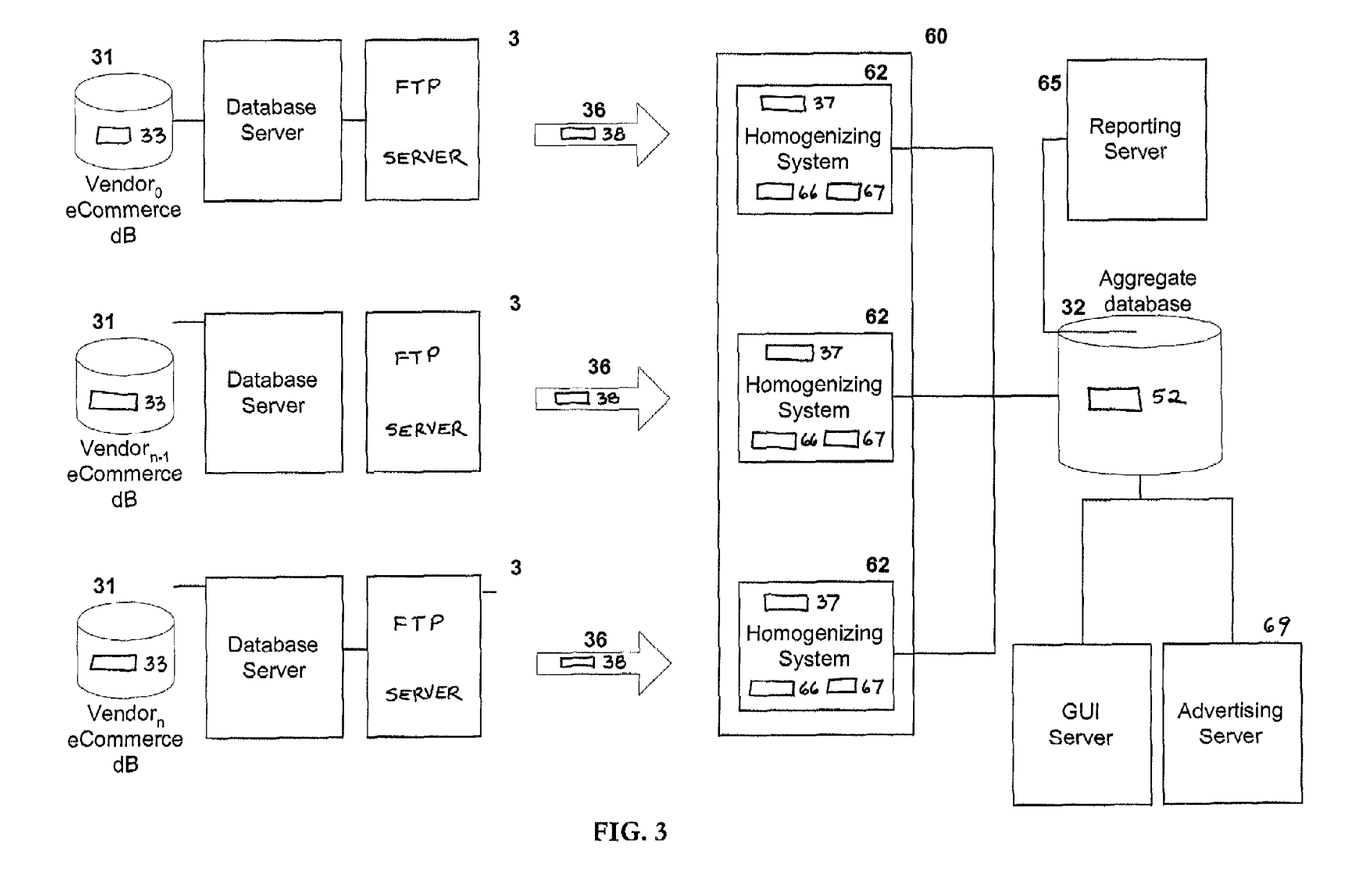
FIG. 3 depicts a simplified block diagram of an embodiment of the invention.

Referring to FIG. 3, the invention enables OSPs 1 to improve a User's online shopping experience by improving the efficiency of a User's online shopping queries. One aspect of the invention comprises a homogenizing function 60 under control of the OSP 1 that standardizes the format of commerce item information 33 contained within data feeds 36 received from the distinct vendors 3. The homogenizing function 60 further stores the homogenized commerce item information 33 to an aggregate database 32. The homogenizing function 60 generally comprises a homogenizing system 62, i.e. hardware under control of software, under management by the OSP 1 to receive and store the commerce item information 33 from distinct vendors 3 into the schema of the aggregate database 32 using a common format.

Another aspect of the invention associates a commerce item information tag 52 with the commerce item information 33 entered into the aggregate database 32. The commerce item information tag 52 facilitates the gathering and reporting of commerce metrics related to the commercial activity of commerce item for sale through the online merchant system. Commerce metrics are considered to include or relate to the temporal, quantitative, or qualitative information regarding advertisement(s) of, and regarding database shopping "hits" retrieving commerce item information 33 from the aggregate database 32. A further aspect of the invention comprises the local generation of such commerce item information tags 52 and the use of an advertising server 69 with the tags 52 for reporting and recording such database hits.

DESCRIPTION OF THE PREFERRED EMBODIMENTS

The preferred embodiments of the invention are useful, for example, in an online merchant system. Referring to FIG. 3, a homogenizing function 60 standardizes the format of commerce item information 33 received from distinct vendors 3 into the online merchant system and further associates a commerce item information tag 52 with the received commerce item information 33 to enable the capture of metrics, i.e. "commerce metrics", related to the commercial activity of commerce items that are advertised and are for sale through the online merchant system.

In a first preferred embodiment, the homogenizing function 60 comprises a hardware and software homogenizing system 62. The homogenizing system 62 standardizes the commerce item information 33 contained within the commerce item information data feeds 36 originating from the online merchant systems of a plurality of distinct online vendors 3. The system 62 further initiates the storage of the commerce item information 33 in the aggregate database 32. In a second embodiment (not shown), the homogenizing function 60 communicates and/or provides to vendors a preferred standardized format for data feeds 36 delivered from such distinct online entities. In either embodiment, the homogenizing function 60 further initiates the association of commerce item information tags 52 with the commerce item information 33, both stored to the aggregate database 32.

In the first embodiment, commerce item information 33 contained within data feeds 36, which originate from distinct online entities are routed to the homogenizing system 62 in a manner ordinary in the art for internet infrastructure systems. Thus, the homogenizing system 62 includes a communication function/application implementing an Internet Protocol stack. The system 62 may access the File Transfer Protocol (FTP) server located on each of the distinct vendors' merchant systems, or alternatively, the online entities may interface with the FTP server of the system 62 to initiate delivery of the data feeds 36.

Each data feed 36 comprises a number of commerce item information elements 38 that are later combined by the homogenizing system 62 into distinct information packets 37. Each commerce item information packet 37 relates to a commerce item for sale from the online vendor 3 and comprise such commerce item information elements 38 that collectively relate to the commerce item for sale.

It should be noted that examples of data feed and/or commerce item formats are Product Markup Language (PML) and XML.

In the preferred embodiment of the invention, because the formats of delivered commerce item information from the distinct vendors are contemplated to vary to some degree, the homogenizing system 62 comprises a parsing function 66 that detects a packet delimiter indicating breakpoints between commerce item information packets 37. Packet delimiter detection may comprise either the use of a standard packet delimiter or communication between the vendor 3 and OSP 1 as to the nature of the packet delimiter.

The homogenizing system 62 also comprises a mapping function/application 67 that writes the commerce item information to the aggregate database 32 according to the schema of the aggregate database 32.

Figure 4:
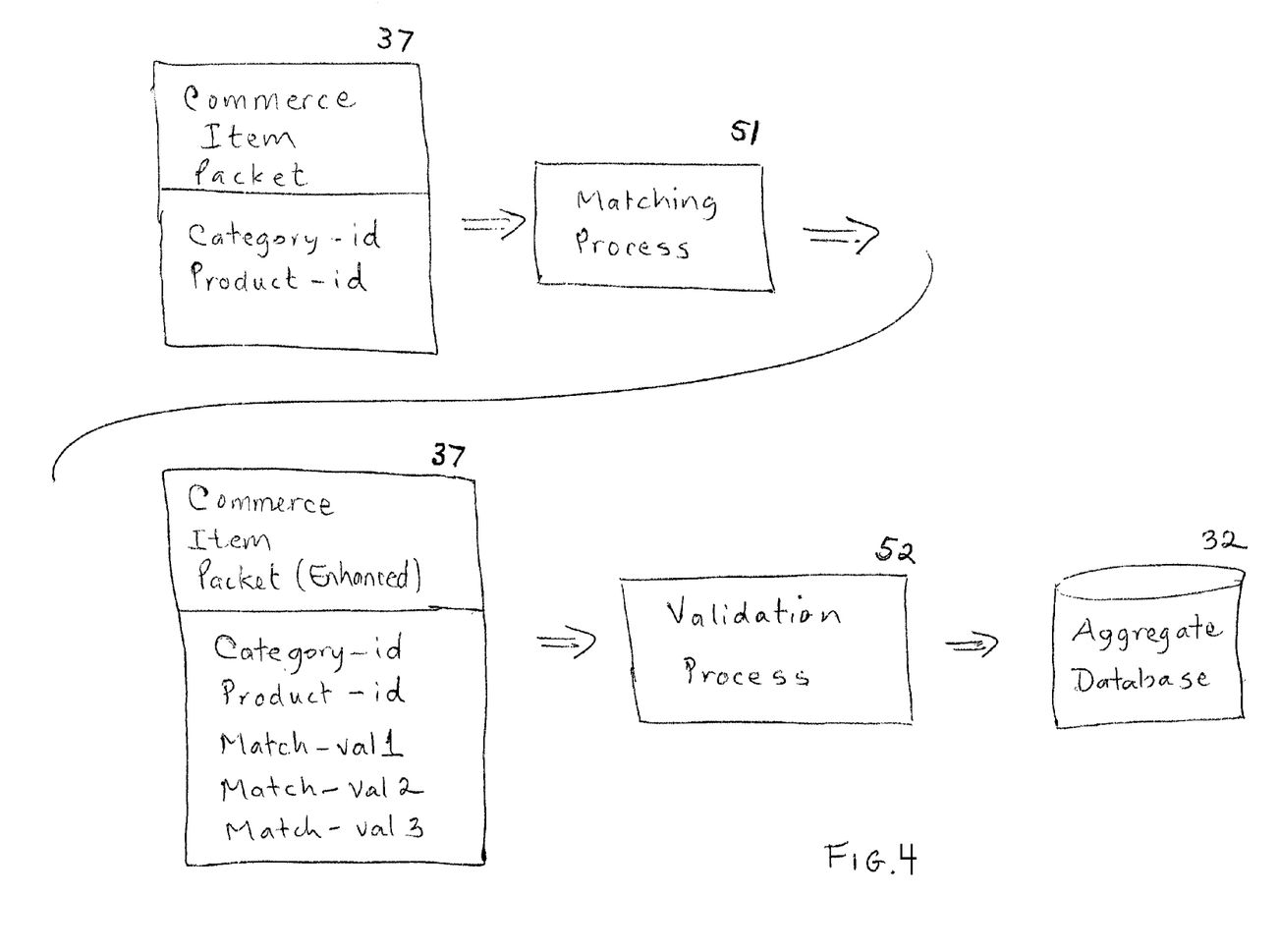
FIG. 4 depicts a flow diagram of the homogenizing process according to the invention.

A preferred data homogenizing processes comprises two logical processes, and is described with reference to FIGS. 3 and 4. The first process is a matching process 51 that separates information packets 37 by primary categories and then applies a similarity search on the packets 37. The similarity search involves comparing specific commerce item information from each commerce item to those within a database of known commerce items by using a set of weights and filters related to the commerce item category. A result of the matching process is each commerce item information packet 37 is augmented with resultant matching results.

The second process is a validation process 52 whereby each commerce item packet 37 is read and/or the associated database record representing the commerce item is read, and such associated database record of the aggregate database 32 is inserted, updated, or deleted.

Figure 2:
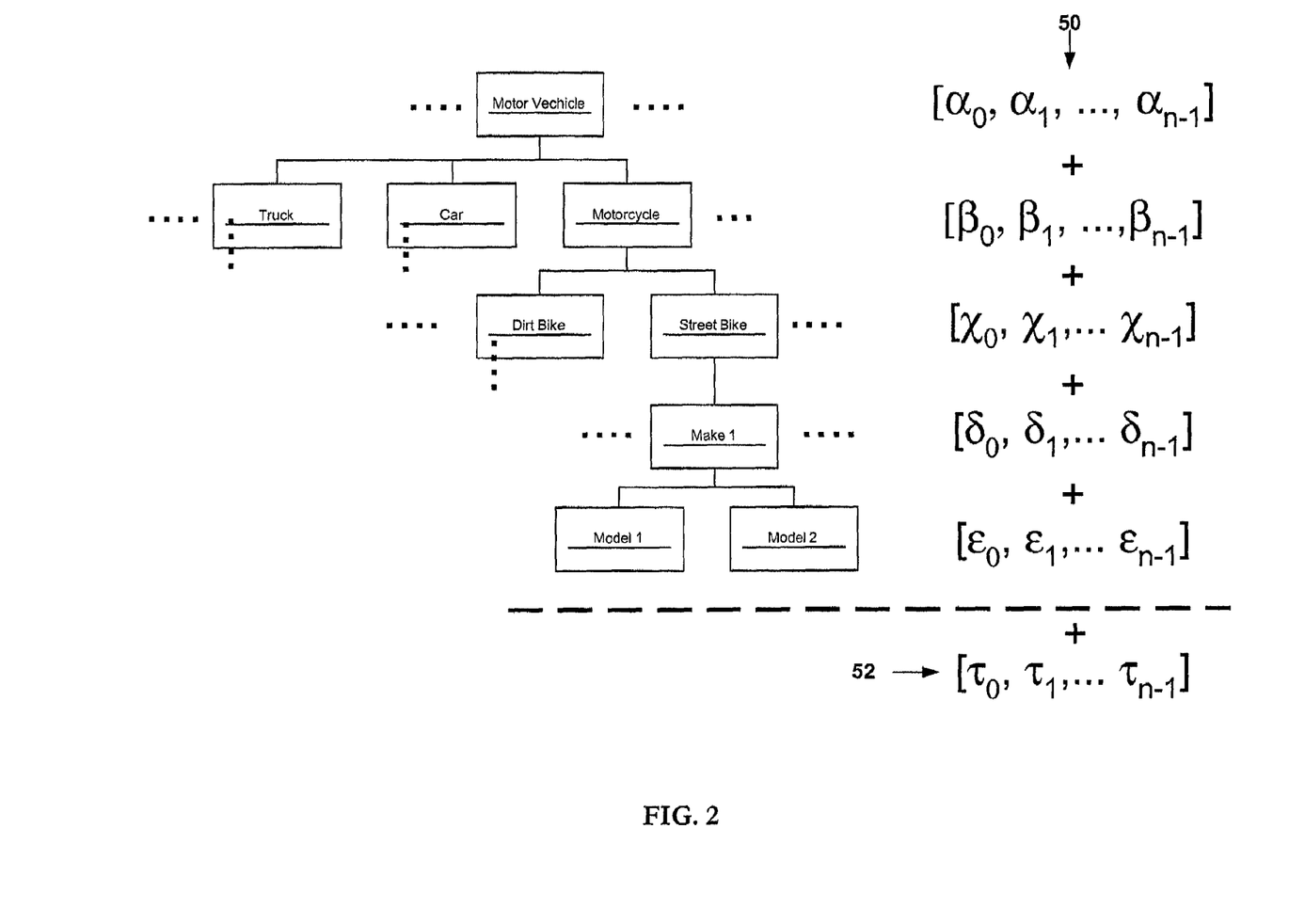
FIG. 2 depicts an embodiment of a methodology for generating product identifiers 50 including commerce item information tags 52.

One preferred aggregate database 32 schema comprises a hierarchical structure of categories of commerce items grouped according to consumer shopping expectations. In other words, the database schema associates related or competitive commerce items within the aggregate database 32 such that a User's shopping query of the aggregate database 32 will return commerce item information 33 from distinct vendors 3 for competitive commerce items. FIG. 2 depicts an example of a hierarchical structure of entities representing commerce items.

The preferred homogenizing function 60 also generates and associates product identifiers ("PIDs") 50 with the commerce item information 33 stored in the aggregate database 32 according to a methodology that reflects both similarities and differences in commerce items. Thus, in an example methodology depicted in FIG. 2, PIDs 50 for two different commerce items, e.g. Models of dirt bikes from the same Maker, may have similar vendor item information 33, and hence similar PIDs 50 comprised of like components, e.g. $_{-n}+_{-n}+_{-n}+_{-n}$, but also include a distinguishing PID 50 component e.g. $_{-0}$ or $_{-1}$. Further, it is preferable that at least a portion of the PID 50 is designated as a commerce item information tag 52. That is, it should be appreciated that $_{-i}$ is a concatenation of corresponding items above it as shown in FIG. 2. Finally, while not preferred, it is contemplated that portions of a particular PID 50, or the commerce item information tag 52, be generated by separate business entities—such as by vendors 3, aggregators 4, and OSPs 1—and combined to form the resultant PID 50.

PID 50 and commerce item information tag 52 generation according to the preferred embodiment is preferably automatic and software controlled. In one embodiment, a sorting or filtering algorithm is implemented that parses vendor item information 33 from the vendor's data feed 36, sorts that item information 33, and assign PIDs 50 and commerce item information tags 52 to each unit of vendor item information 33 stored into the aggregate database 32. The preferred algorithm to generate PIDs 50 comprises a sorting or filtering function to detect similarities and differences between vendor item information 33 describing commerce items, a PID 50 generating function, and a PID 50 assignment function that associates the generated PIDs 50 and the respective vendor item information 33 within a database. Parsing and sorting algorithms are ordinary in the art and a person with ordinary skill in the art would be able to create a parsing and sorting algorithm according to the requirements disclosed herein.

The commerce item information tag 52 included together with the commerce item information 33 in the aggregate database 32 preferably comprises a unique sequence of elements, e.g. alpha numeric or binary sequence, that enables the capture and reporting of commerce metrics on the particular commerce item associated with the commerce item information tag 52. Thus, the commerce item information tag 52 enables the recordation and reporting of commercial activity related to a commerce item. In the preferred embodiment, a reporting server 65 implemented either in software on the Web server or in a separate hardware/software system (see FIG. 3), detects and records aggregate database 32 queries retrieving commerce item information tags 52 thereby capturing commerce metrics reflecting the commercial activity of a commerce item. Moreover, because commerce item information tags 52 are traceable to the commerce item information 33 and the online entity originating the commerce item information 33, detailed reports regarding particular commerce items may be generated. Each occurrence of a commerce metric of a particular commerce item, as indicated by a retrieval of associated commerce item information 33 from the aggregate database 32, initiates a recordation and reporting of the associated commerce item information tag 52 by the reporting server 65.

Commerce metrics may be measured and recorded by the commerce item information tag 52 by software methods and/or functions that include; incremented counters, time-date stamping, and recordation of User Web navigation history. Moreover, commerce item information 33 and tags 52 may be retrieved from the aggregate database 32 by a User initiated event or a software initiated event. Thus, a User's shopping queries retrieving commerce item information 33 and tags 52 generates commerce metrics that can be captured by the reporting server 65.

The reporting server 65 may thereafter be queried by the vendor 3 and/or the OSP 1 to generate reports regarding commerce metrics.

Additionally, an advertising application/server 69 may also generate and record commerce metrics of commerce item information elements, e.g. specs, price, images, may include advertising elements. Thus, commerce metrics are also generated as the advertising application/server 69 pulls commerce item information 33 and tags 52.

It should be noted that in the preferred embodiment, a second tag that is invisible to the User is created when results from the User's query to the database 32 is displayed to the User's browser. This second tag contains an embedded request to the advertising server 69. That is, as each displayed item in a query result is displayed on the User's browser, the second tag performs a unique request to the advertising server 69 using the commerce item information 52. The unique request to the advertising server also includes the query term that caused the query result to be displayed. Hence, the advertising server 69 reports the advertising request for each of the items, thus creating a record of each item displayed as a result of a query term. Rather than return an advertising image, the advertising server returns a small 1-by-1 pixel image that is invisible to the User.

It should be noted that several commerce metrics reports are enabled by the invention. Preferred recorded and reported commerce metrics related to commerce items include specific and general information regarding, but not limited to user shopping queries of the aggregate database 32 and tracking of commerce item advertisements on the online merchant system.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A system for quantifying the effectiveness of advertising using an online merchant system that facilitates commercial transactions involving commerce items, comprising:

a commerce item information receiving system that is accessible by at least one online entity that may interface with the commerce item information system to deliver a data feed comprised of plurality of commerce item information packets that relate to commerce items that can be shopped for by online users via the online merchant system, the commerce item information receiving system under hardware and software control to:

receive, map, and store each commerce item information packet into an aggregate database using a common commerce item information format; and associate a commerce item information tag to each commerce item information packet stored within the aggregate database;

the system for quantifying the effectiveness of advertising further comprising:

a commerce metric recording system, accessible to a vendor, that records commerce metrics related to the online activity regarding any particular commerce item by recording queries of the aggregate database regardless of whether the query represents a sale returning a specific unit of commerce item information and the associated commerce item information tag; and an advertising system, configured to generate and record commerce metrics for tracking the effectiveness of advertising.

2. The system in claim 1, wherein said recording system further enables reporting commerce metrics to an online entity comprising any of:

an online service provider; and said vendor.

3. The system of claim 1, wherein, commerce metrics comprise at least one of:

a number of user aggregate database queries retrieving the commerce item information associated with the commerce item information tag;

temporal aspects related to said user database queries retrieving the commerce item information associated with the commerce item information tag; and aggregate database retrievals initiated by the online merchant system for advertisement related purposes.

4. The system of claim 1, wherein the commerce item information tag further comprises:

a product identifier, the product identifier generated according to a methodology that reflects similarities in commerce item information.

5. The system of claim 4, wherein the methodology for generating product identifiers for association with the commerce item information in the aggregate database generates product identifiers that also reflect the differences in commerce item information.

6. The system of claim 1, wherein said commerce metrics comprises browsing habits.

7. The system of claim 1, wherein said recorded queries comprise a query term resulting in display of said specific unit of commerce.

8. The system of claim 1, wherein said commerce metrics comprises query results of each item displayed as a result of a query term.

\* \* \* \* \*

UNITED STATES PATENT AND TRADEMARK OFFICE
CERTIFICATE OF CORRECTION

PATENT NO.       : 7,324,964 B2                                  Page 1 of 1
APPLICATION NO.  : 10/008772
DATED            : January 29, 2008
INVENTOR(S)      : Martin L. Gronberg and C. Wade Chambers It is certified that error appears in the above-identified patent and that said Letters Patent is hereby corrected as shown below:

On the Title Page Item -73- Assignee: replace "AMERICA ONLINE, INC."

with -- AOL LLC --

Signed and Sealed this

Twenty-seventh Day of May, 2008

JON W. DUDAS
*Director of the United States Patent and Trademark Office*